Nov. 10, 1964     H. M. NANCE     3,156,856
AUTOMATIC SEAM TRACKING SYSTEM
Filed Sept. 5, 1962
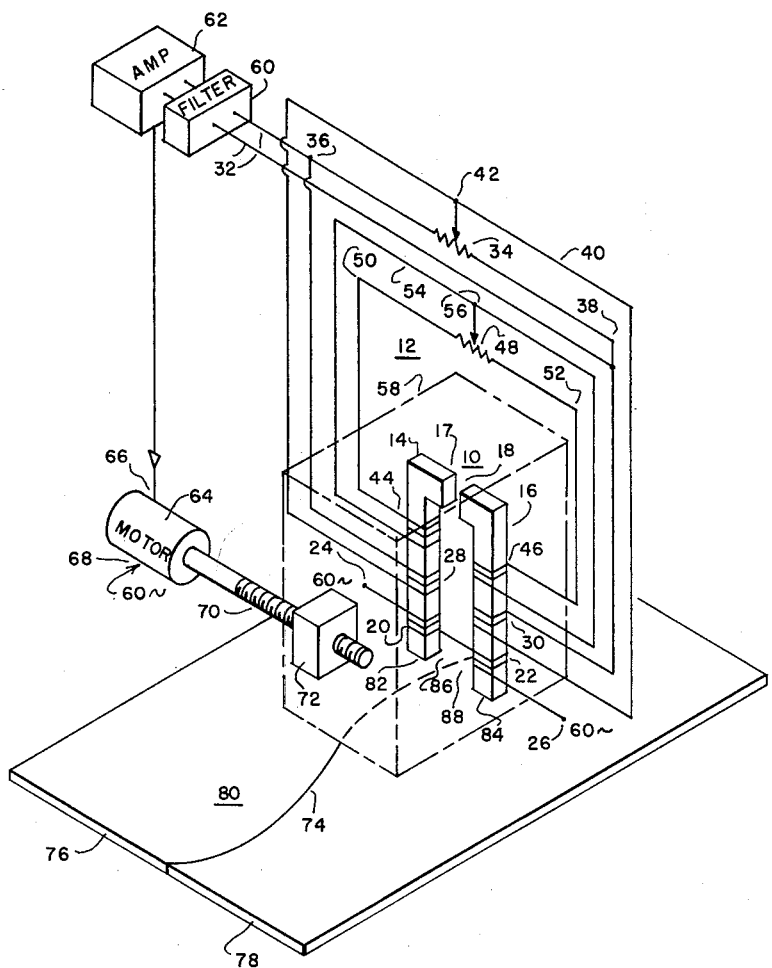
HERSHEL M. NANCE,
*INVENTOR.*
BY *G. D. O'Brien*
*Charles A. Phillips*
ATTORNEYS

3,156,856
AUTOMATIC SEAM TRACKING SYSTEM
Hershel M. Nance, Rte. 1, Wellington, Ala.
Filed Sept. 5, 1962, Ser. No. 221,944
11 Claims. (Cl. 318—31)
(Granted under Title 35, U.S. Code (1952), sec. 266)

The invention described herein may be manufactured and used by or for the Government of the United States of America for governmental purposes without the payment of any royalties thereon or therefor.

This invention relates to the art of locating and following a seam or other discontinuity in a work piece and particularly to improved electro-magnetic means for seam following or tracking.

Seam tracking equipment is used in a variety of applications, particularly where automatic tooling operations such as cutting or welding are employed to work along an irregular course, and in recent years such usage has increased as automation has progressed. Various methods of detecting and following seams have been employed with perhaps two types, photoelectric and electromagnetic, being the principal ones used today. Certain current trends appear to favor the photoelectric approach apparently due to difficulties experienced with electromagnetic devices and it is with respect to these difficulties that the present invention is addressed.

The invention followed an analysis of photoelectric techniques and the finding that known devices of this type were not too satisfactory in that an index mark had to be positioned along an edge and the resulting tracking was edge, rather than precise seam, tracking. In many instances, particularly in welding, it is necessary to determine the center of a joint between two pieces of material forming one side of a seam, and information as to an edge is inadequate.

Anderson Patent 2,921,179 and Sommeria Patent 2,971,079 are descriptive of relatively recent efforts to perfect the technique of seam tracking by electromagnetic means. However it has been determined that neither type of seam trackers shown by these references or other known types overcome difficulties which have been experienced in tracking certain type seams, notably those separating heavy aluminum sheets, e.g., thicker than ⅛ inch. The difficulties are, in general, twofold, lack of sensitivity and susceptibility to faulty action when employed in the environment of tool operations, such as electrical welding which produces severe electrical interference.

It has been discovered that by a somewhat radical approach in working frequency, together with an improved transducer, that both the aforesaid difficulties may be diminished substantially. Instead of employing high frequencies wherein "skin effects" are a significant factor, as in Anderson and Sommeria, and generally the case with electromagnetic tracking as previously practiced, it has been found that in accordance with the present invention that tracking frequencies can be reduced to below a few hundred cycles and in fact excellent results are obtained at 60 cycles. This carries the added bonus that no demodulation or modulation equipment need be employed to develop servo signals, as standard two-phased servo motors (for positioning the seam tracking transducer and working tool) operating in this frequency range, can be driven by transducer signals in their initial form except, perhaps, for amplification.

In practicing the invention a tracking transducer is constructed having two magnetic core or leg members positioned side-by-side but separated at the tracking or sensing end by a small distance (e.g. ½ inch). Associated with each core member are means for inducing a low frequency flux through it. A flux sensing means, coupled to each core member, provides an error signal which shifts phase each side of zero error and is employed to drive electromechanical means, such as a two-phased servo motor which repositions the transducer sideways to a balanced position where the core members are equidistant from the seam which is being tracked, at which point the error signal becomes zero. It will be appreciated that the direction of rotation of a two phase motor depends upon whether the two inputs are in or out of phase. As stated above, the signal input to the flux inducing means is quite low in frequency, and is generally in the range between 25 and 100 and upward to 1000 cycles.

Other features and advantages of the present invention will be apparent by the following detailed description when considered with the accompanying drawing which is a schematic diagram illustrating a seam tracking system in accordance with the invention.

Referring now to the drawing, a generally U shaped core assembly 10 of a transducer assembly 12 consists of two L shaped laminated core members 14 and 16 that are positioned side-by-side but separated at the base 17 of the U, which is inverted, by a small gap 18 (e.g. .030 inch). The leg portions of the U are separated by approximately ½ inch. Each core member has the equivalency of three windings or coils wound or otherwise positioned thereon and, in the embodiment illustrated each coil consists of approximately twenty-five hundred turns. The flux inducing or input windings 20 and 22, designed in this instance for low voltage operation and positioned on core members 14 and 16, respectively, are connected in series across a 40 volt, 60 cycle source between terminals 24 and 26. For 110 volt operation the number of turns is increased approximately 2½ times. The windings are poled to produce opposite direction flux effects on the core structure as a whole and thus the instantaneous fluxes in the vertical portions of core members 14 and 16 are in phase or of like direction, up or down.

Windings or coils 28 and 30 on core members 14 and 16, respectively, are connected in series to form output winding circuit 32 which provide the output of the transducer assembly 12.

A potentiometer 34 is connected across the otherwise free terminals or ends 36 and 38 of windings 28 and 30 and the common or series connection 40 of the windings is connected to an intermediate adjustable terminal 42 of potentiometer 34.

The third set of windings, windings 44 and 46 which are connected in series, provide a balancing effect to assist initial adjustment of the transducer for zero output for zero position error prior to operation. Potentiometer 48 is connected across the otherwise free terminals or ends 50 and 52 of windings 44 and 46, and the common or series connection 54 of windings 44 and 46 is connected to an intermediate adjustable terminal 56 of potentiometer 48.

With windings 20 and 22 energized and transducer 12 suspended in air remote from unbalancing effects, potentiometers 34 and 48 are alternately adjusted until there is zero or minimum output across output winding circuit 32.

Core members 14 and 16 with their associated windings are potted in a suitable electrical potting compound such as Scotchcast XR–5038 (not shown) with a stainless steel outer case 58. In instances where uneven heating of the cores and windings may occur, as where they are located close to an electrical torch, a region for a cooling medium, such as circulating water, is provided (by means not shown) between the potting material and case 58. In this manner the tendency of core warpage and winding displacement will be forestalled and thus the possibility of electrical unbalance of transducer 12 due to heating will be prevented.

The 60 cycle output of output winding circuit 32, an error signal that results when transducer 12 bears an unbalanced position with respect to a seam, is fed to 60 cycle bandpass filter 60 which is tuned to pass 60 cycles and reject other frequencies. The output of bandpass filter 60 is amplified in amplifier 62 to bring the error signal to an operating level sufficient to operate servo motor 64 to which the error signal is fed at input 66 together with a 60 cycle source signal at input 68. Servo motor 64 (supported by fixed or traveling means, not shown) is a 60 cycle two-phased reversible motor, that drives a screw 70 which is threaded in a nut 72 fastened to transducer case 58 to provide a transverse or side-to-side movement of transducer 12 (together with any attached tool, not shown) with respect to a seam 74 separating, for example, sections 76 and 78 of ¼" aluminum plate comprising workparts 80.

In operation, with windings or coils 20 and 22 energized, eddy currents are generated within workparts 80 and flux fields induced into workparts 80 through the ends 82 and 84 of core members 14 and 16, respectively. These eddy currents, which are circular, in turn generate fields which tend to oppose the fields which produced them. Seam 74 provides an edge or restriction to these currents and in the event that the seam is positioned nearer to one core member than the other core member the eddy currents will be decreased on the near side, as for example, side 86 of the seam. At the same time on the other side, that is side 88 of the seam, with the core-to-seam distance increased, the eddy currents will increase. The result will be that there is less flux opposition to the flux in core member 14 than to the flux in core member 16 to produce an unbalance in the net flux in core assembly 10. This unbalance is manifested by a greater amplitude voltage being induced in coil 28 than in coil 30. Accordingly the output voltage appearing across output winding circuit 32 will be responsive to coil 20. If the transducer were laterally shifted to a position with core member 16 closer to the seam than core member 14 the opposite effect would occur with the output voltage across output winding circuit 32 following coil 22 and being of opposite (differing by 180°) phase. The interconnection of coils 28 and 30 are poled to produce a phase of input voltage to servo motor 64, through bandpass filter 60 and amplifier 62, which will produce rotation of motor 64 and screw 70 in a direction which will move transducer 12 laterally to a balanced position with respect to seam 74 at which point the error voltage will drop to zero and motor 64 will stop.

Air gap 18 between cores 14 and 16 improves the response of transducer 12 in the sense that the transducer is less sensitive to extraneous structures and electrical noise. The gap width is not too critical being here on the order of .030 inch, and, with some sacrifice in sensitivity can be widened to the point where base 17 is dispensed with. The distance from the transducer to the workparts 80 has little effect. While average working proximity is between ½ and ¾ inches it will sense a seam from as high as 4 inches. Further, offsets (one piece higher than other), of sections 76 and 78 of workparts 80 as much as a 100 percent of material thickness have slight effect. In general, trackings errors less than the width of a fine line are experienced even though there is a poor fit between the workpart sections. The transducer is quite insensitive to the magnetic effects of electrical welding or cutting torches attached to and positioned by transducer 12. Copper, or stainless steel holddown fingers or backup bars employed to hold workparts 80 appear to have no effect regardless of groove configurations. The transducer follows uneven thickness materials as well as even thickness materials and, with aluminum, generally works best with material thicker than ⅛ inch. While the source frequency for transducer 12 illustrated herein is 60 cycles, it has been found that other low frequencies work well, with 400 cycles being a convenient choice as two-phased servo motors are available for this frequency.

In addition to such variations as frequency of operation it is to be appreciated that other modifications of the present invention are possible in light of the above teachings. It is therefore to be understood that within the scope of the appended claims, the invention may be practiced other than as specifically described.

What is claimed is:

1. An automatic seam tracking system for following a seam on a planar surface comprising:
   (A) a magnetic core assembly having first and second core members positioned on one side of said planar surface and in a contiguous relationship with respect to one another;
   (B) first flux inducing means coupled to said first core member for inducing a first flux thru said first core member and second flux inducing means coupled to said second core member for inducing a second flux thru said second core member, said first and second flux being in phase;
   (C) a reference source of low frequency electrical current energizing said flux inducing means;
   (D) first flux sensing means responsive to flux thru said first core member for producing a first signal voltage and second flux sensing means responsive to flux thru said second core member for producing a second signal voltage;
   (E) signal combining means responsive to said first and second signal voltages for providing a combined signal output voltage, said first and second signal voltages being combined in a phase to produce subtraction;
   (F) electromechanical means responsive to said combined signal and said reference source of low frequency current for producing motion in a first direction when said combined signal and reference source are in phase, and motion in a second direction when said combined signal and reference source are out of phase; and
   (G) drive means coupled between said electromechanical means and to said magnetic core assembly for positioning said magnetic core assembly so that said combined signal is reduced to a minimum value.

2. The automatic seam tracking system set forth in claim 1, wherein said drive means is adapted for moving said core assembly sideways in respect to the seam being followed.

3. The automatic seam tracking system set forth in claim 2 wherein said first flux inducing means comprises a first electrical winding about said first core member and said second flux inducing means comprises a second electrical winding about said second core member.

4. The automatic seam tracking system set forth in claim 3 wherein said first flux sensing means comprises an electrical winding about said first core member and said second flux sensing means comprises an electrical winding about said second core member.

5. The automatic seam tracking system set forth in claim 1 wherein said magnetic core assembly approximates the shape of a U with said core members representative of the legs of the U and the base of the U comprising a magnetic core between said core members interrupted by a small gap.

6. The automatic seam tracking system set forth in claim 1 wherein the ends of said core members remote from the seam being tracked are arranged in juxtaposed position with a gap existing therebetween.

7. An automatic seam tracking system comprising:
   (A) magnetic core means having first and second core members, said core members being placed in a contiguous relationship with respect to one another;
   (B) first flux inducing winding means coupled to said first core member for inducing a first flux thru said first core member and second flux inducing winding means coupled to said second core member for inducing a second flux thru said second core member, said first and second flux being in phase with respect to one another;
(C) a reference source of low frequency electrical current energizing said flux inducing winding means;
(D) first flux sensing means responsive to flux through said first core member for producing a first signal voltage and second flux sensing means responsive to flux through said second core member for producing a second signal voltage;
(E) signal combining means responsive to said first and second signal voltages for providing a combined signal voltage, said first and second signal voltage being combined in a phase to produce subtraction;
(F) electromechanical means responsive to said combined signal and said reference source of low frequency current for producing motion in a first direction when said combined signal and reference source are of like phase, and motion in a second direction when said combined signal and reference source are of unlike phase;
(G) drive means coupled between said electromechanical means and said magnetic core means for positioning said magnetic core means so that said combined signal is reduced to a minimum value; and
(H) circuit balancing means coupled to said magnetic core means for adjusting the output of said magnetic core means to substantially zero when said magnetic core means is properly positioned over the seam to be tracked.

8. The automatic seam tracking system set forth in claim 7 wherein said circuit balancing means comprises:
(A) a first compensating winding around said first core member and a second compensating winding around said second core member;
(B) a first potentiometer having two end terminals and an adjustable intermediate terminal,
  (i) one of said end terminals of said first potentiometer being connected to one end of said first compensating winding and the other of said end terminals being connected to one end of said second compensating winding,
  (ii) the remaining free ends of said compensating windings being connected to said intermediate terminal of said first potentiometer;
(C) a second potentiometer having two end terminals and an adjustable intermediate terminal,
  (i) one of said end terminals of said second potentiometer being connected to one end of said winding of said first flux sensing means and the other end terminal of said second potentiometer being connected to one end of said winding of said second flux sensing means,
  (ii) the remaining free ends of said windings of said first and second flux sensing means being connected to said intermediate terminal of said second potentiometer.

9. The automatic seam tracking system set forth in claim 8 wherein said source of low frequency has a frequency output in the range of 25 cycles to 1000 cycles.

10. The automatic seam tracking system set forth in claim 9 wherein said source of low frequency has a frequency output in the range of 25 to 100 cycles.

11. The automatic seam tracking system set forth in claim 10 further comprising bandpass filtering and amplifying means coupling said signal combining means and said electromechanical means for passing only the output frequency of said low frequency source and amplifying said output frequency.

References Cited in the file of this patent
UNITED STATES PATENTS

| | | |
|---|---|---|
| 2,871,432 | Marzetta | Jan. 27, 1959 |
| 2,946,939 | Lind | July 26, 1960 |
| 2,948,842 | Ditto | Aug. 9, 1960 |